(12) United States Patent
Piontek

(10) Patent No.: US 7,299,610 B2
(45) Date of Patent: Nov. 27, 2007

(54) PARK/DRIVE MECHANICAL INTERLOCK SYSTEM FOR ZERO TURN RADIUS MOWERS

(75) Inventor: Alan F. Piontek, Lincoln, NE (US)

(73) Assignee: Great Plains Manufacturing, Incorporated, Salina, KS (US)

( * ) Notice: Subject to any disclaimer, the term of this patent is extended or adjusted under 35 U.S.C. 154(b) by 297 days.

(21) Appl. No.: 11/055,386

(22) Filed: Feb. 10, 2005

(65) Prior Publication Data

US 2006/0174601 A1    Aug. 10, 2006

(51) Int. Cl.
*A01D 69/10* (2006.01)

(52) U.S. Cl. ............... 56/11.3; 180/286; 180/315; 180/6.48

(58) Field of Classification Search ........... 180/286, 180/315, 6.48, 275, 277, 278, 281, 316; 56/11.3, 56/14.7, 16.7
See application file for complete search history.

(56) References Cited

U.S. PATENT DOCUMENTS

| | | | |
|---|---|---|---|
| 3,942,602 A | 3/1976 | Case et al. | |
| 5,507,138 A | 4/1996 | Wright et al. | |
| 5,600,944 A | 2/1997 | Wright et al. | |
| 5,765,347 A | 6/1998 | Wright et al. | |
| 5,809,755 A | 9/1998 | Velke et al. | |
| 5,984,031 A | 11/1999 | Velke et al. | |
| 6,056,074 A * | 5/2000 | Heal et al. | 180/6.48 |
| 6,059,055 A | 5/2000 | Velke et al. | |
| 6,094,897 A | 8/2000 | Velke et al. | |
| 6,138,446 A | 10/2000 | Velke et al. | |
| 6,189,304 B1 | 2/2001 | Velke et al. | |
| 6,276,486 B1 | 8/2001 | Velke et al. | |
| 6,301,864 B1 * | 10/2001 | Damie et al. | 56/11.3 |
| 6,327,839 B1 | 12/2001 | Velke et al. | |
| 6,343,668 B1 * | 2/2002 | Dean | 180/315 |
| 6,390,225 B2 | 5/2002 | Velke et al. | |
| 6,434,917 B1 * | 8/2002 | Bartel | 56/11.3 |
| 6,516,596 B2 | 2/2003 | Velke et al. | |
| 6,550,563 B2 | 4/2003 | Velke et al. | |
| 6,688,090 B2 | 2/2004 | Velke et al. | |
| 6,729,115 B2 * | 5/2004 | Bartel | 56/11.3 |
| 6,912,831 B2 | 7/2005 | Velke et al. | |

* cited by examiner

*Primary Examiner*—Árpád Fábián Kovács
(74) *Attorney, Agent, or Firm*—Hovey Williams LLP

(57) ABSTRACT

A zero turning radius mower is provided with twin operating levers that are manipulated by the driver to control steering, speed and forward or reverse direction of the mower. When the two drive levers are in the neutral mode, they may be swung outwardly to widespread positions to facilitate operator dismount. If both drive levers are spread apart, a park lever may be operated by the driver to position blocking bars into the path of the levers to prevent their return from the widespread positions. Once the engine is shut off, it can only be restarted when the mower is in its park mode with the park lever engaged.

12 Claims, 10 Drawing Sheets

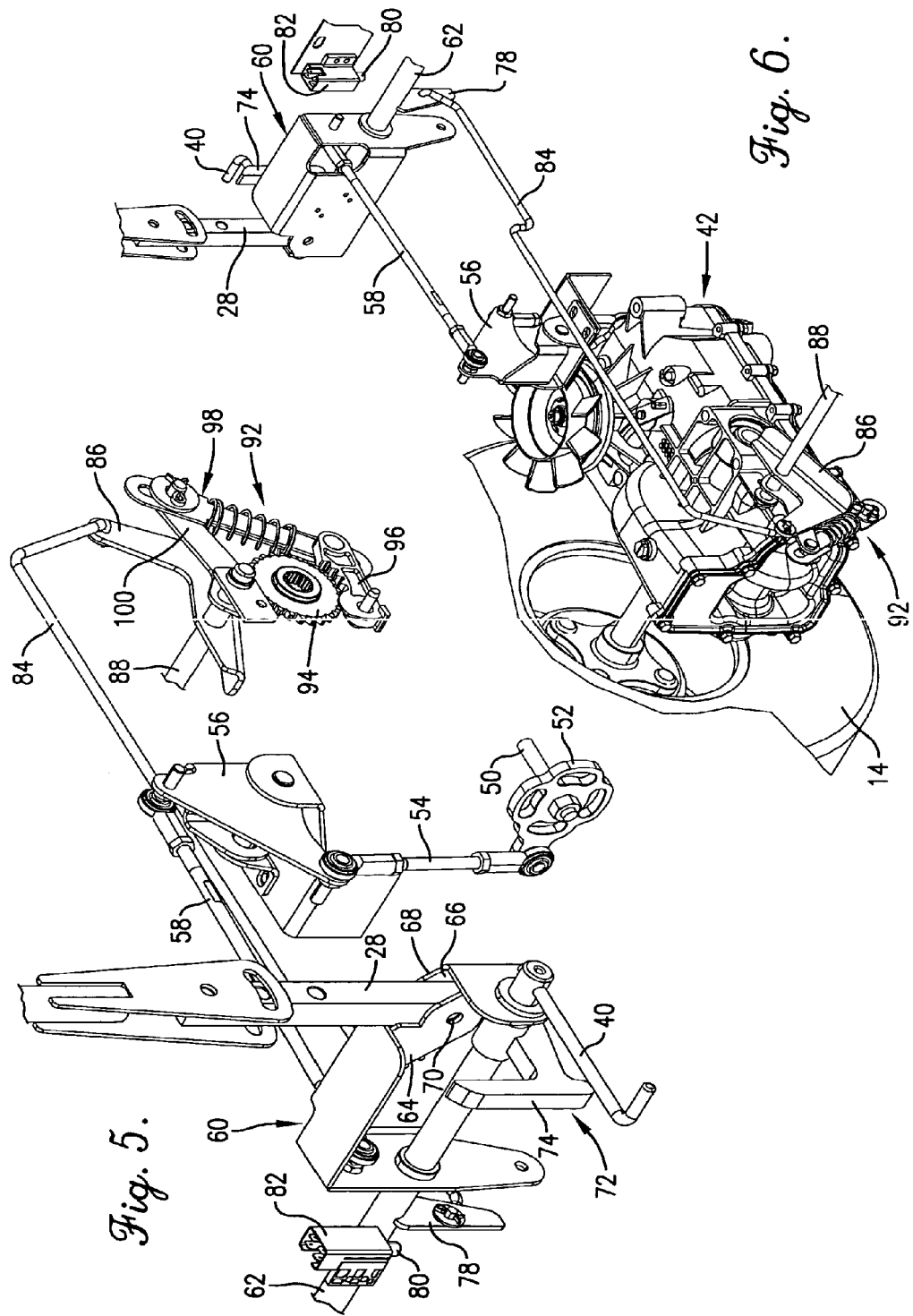

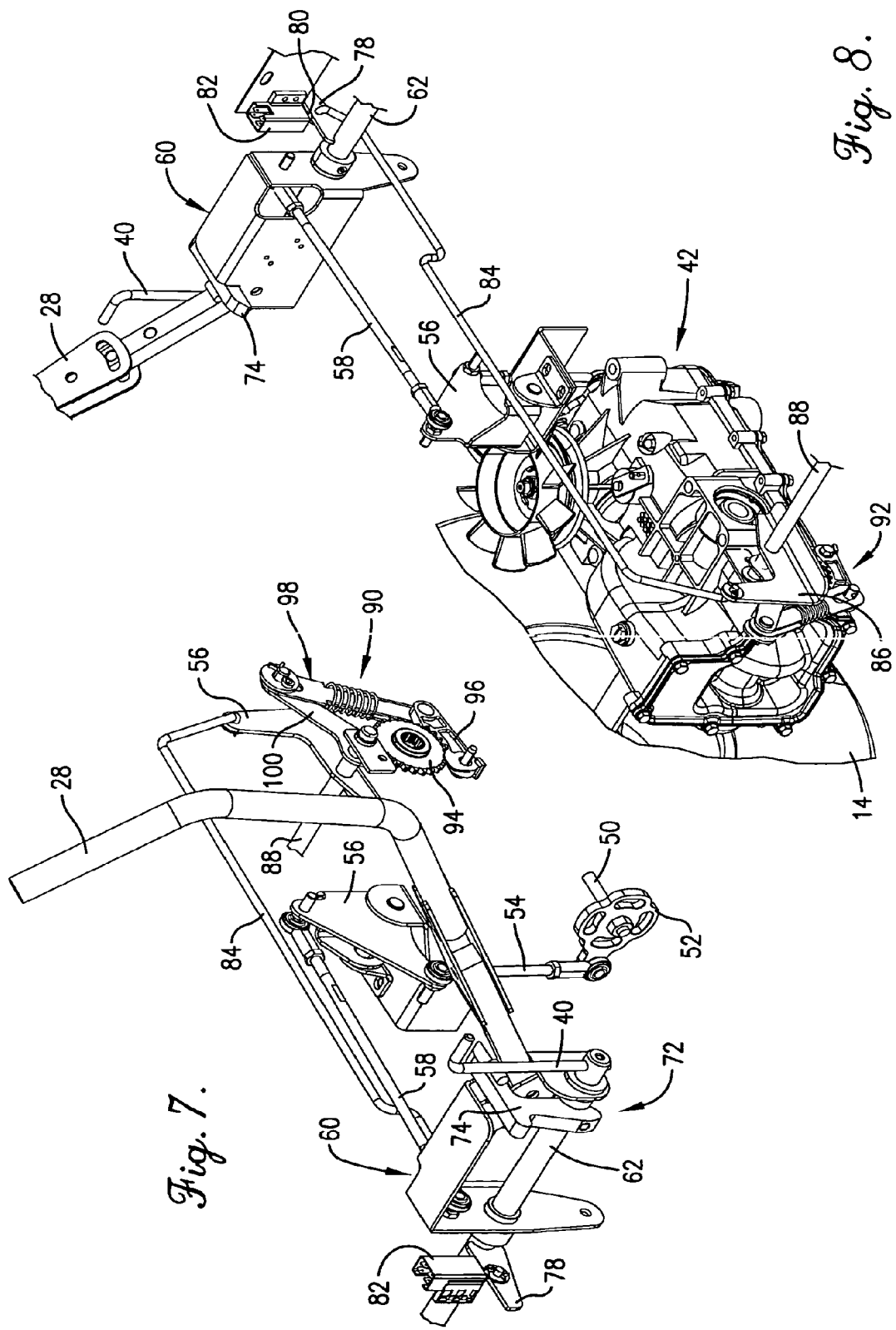

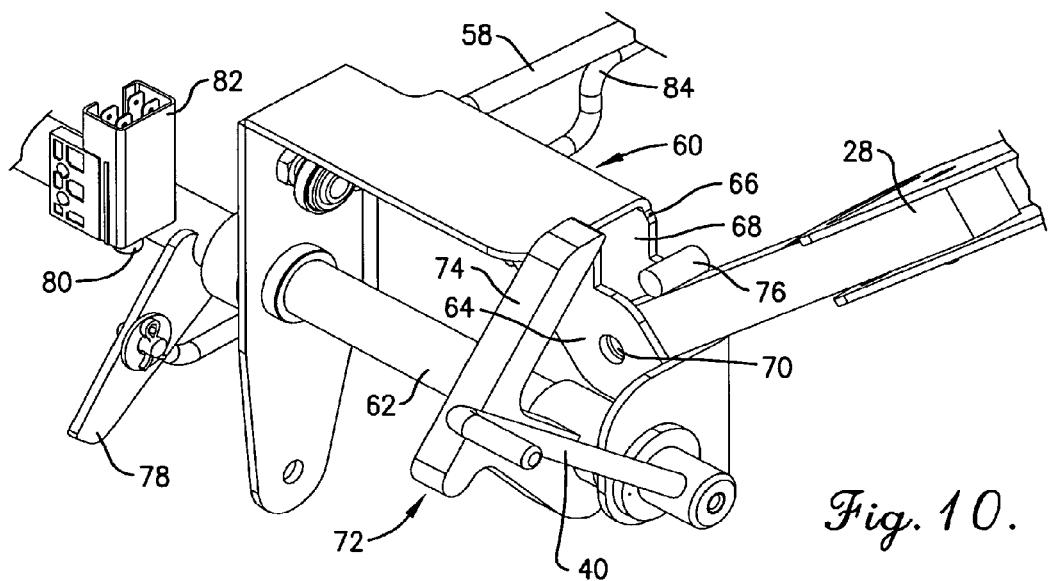
Fig. 10.
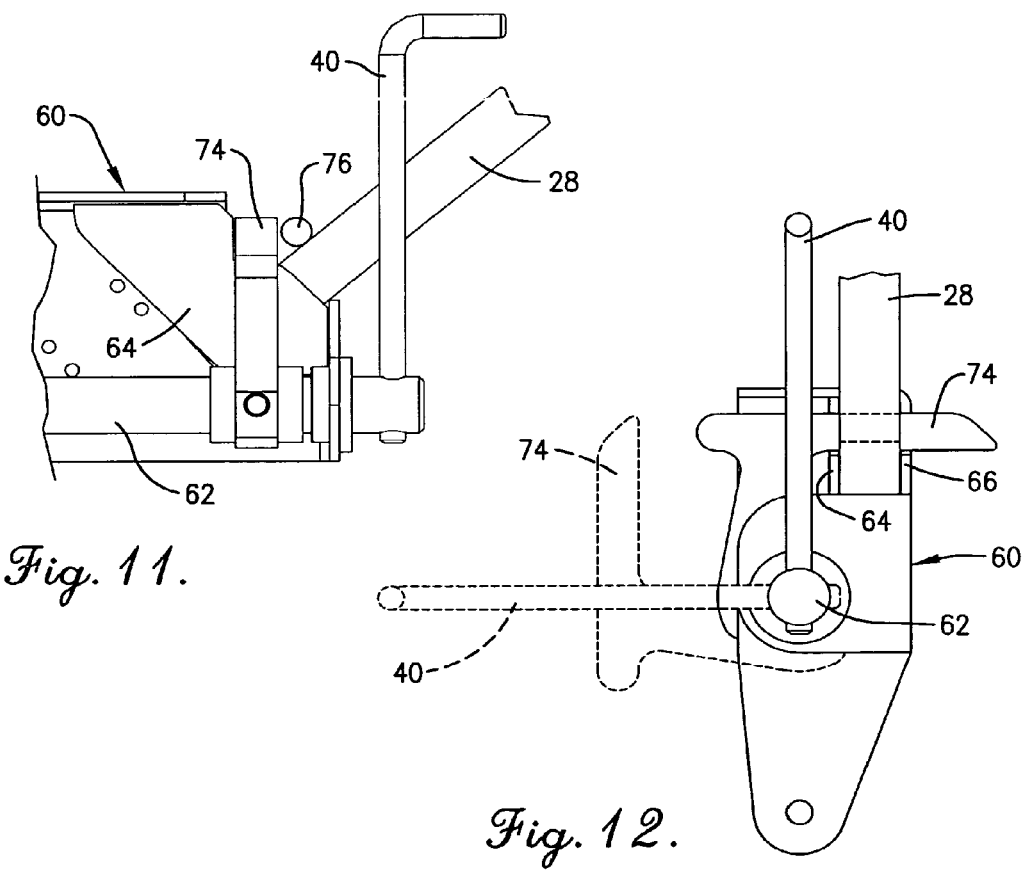
Fig. 11.
Fig. 12.

PARK/DRIVE MECHANICAL INTERLOCK SYSTEM FOR ZERO TURN RADIUS MOWERS

TECHNICAL FIELD

The present invention relates to zero turning radius riding mowers of the type in which the driver controls speed, turning, and forward/reverse travel by manipulating a pair of drive levers adjacent the seat. More particularly, it relates to improvements in a mechanical interlock system for such mowers whereby the mower cannot be placed in park unless the drive levers are in their neutral positions and, conversely, the drive levers cannot be moved into forward or reverse positions until the park lever is released.

BACKGROUND AND SUMMARY

Zero turning radius mowers are well known in the art. Typically, such mowers are provided with twin drive levers that are manipulated by the operator to regulate the speed, turning and forward or reverse operations of the mower. Reversible hydraulic motors associated with the ground-engaging drive wheels are supplied with hydraulic fluid in variable amounts by pumps that are linked to the drive levers. Steering of the machine is accomplished by speeding up or slowing down one of the hydraulic motors relative to the other and, in some instances by reversing the direction of one of the motors relative to the other. The drive levers are movable independently of one another along fore-and-aft paths of travel to accomplish such control.

It is also known in the art to construct the control system in such a way that the drive levers can be swung out laterally away from one another to widespread positions when the controls are in neutral so the operator can dismount the machine. In U.S. Pat. No. 6,434,917, for example, the drive levers also set parking brakes for the drive wheels when the levers are swung out to their widespread positions.

In the present invention the retaining mechanism for each drive wheel, such as a parking mechanism or a safety brake, is applied through the use of a single park lever separate and apart from the two drive levers. The park lever may only be operated when the two drive levers are in the neutral mode and have been swung out to their widespread positions. Once the park lever is engaged, an interlock structure mechanically blocks return of the drive levers from their widespread positions to their fore-and-aft paths of operating travel. Unless the drive levers are in their widespread positions and the mower is in park, the engine of the machine cannot be started once it has been turned off. A control switch forming a part of an electrical control circuit for the mower is actuated by structure operably coupled with the park lever so that the switch is actuated by movement of the park lever to the park position. Although the drive wheels are provided with two separate park mechanisms, they are actuated simultaneously by the single park lever.

BRIEF DESCRIPTION OF THE DRAWINGS

FIG. 5 is a fragmentary, left front isometric view of a portion of the control apparatus associated with the left side of the machine;

FIG. 6 is a fragmentary, right rear isometric view of the left portion of the control apparatus;

FIG. 7 is a fragmentary front isometric view of the control apparatus similar to FIG. 5 but illustrating the left drive lever swung out to its widespread position, the park lever engaged, and the safety interlock structure in place to block return of the drive lever to its fore-and-aft path of travel;

FIG. 8 is a fragmentary right rear isometric view of the control apparatus similar to FIG. 6 but showing the left drive lever in its widespread position, the park lever engaged, and the safety interlock structure blocking return of the left drive lever to its fore-and-aft path of travel;

FIG. 10 is an enlarged, fragmentary, left front isometric view of the control apparatus illustrating the left drive lever in its widespread position and the park lever in the process of being pivoted into its park position;

FIG. 11 is a fragmentary front elevational view of the control apparatus on the left side of the machine illustrating the park lever in its park position and the safety interlock structure blocking return of the left drive lever from its widespread position;

FIG. 12 is a fragmentary, left side elevational view of the control apparatus illustrating the park lever in its park position with the safety interlock structure blocking return of the left drive lever to its fore-and-aft path of travel, the phantom lines in this figure illustrating the positions of the park lever and lock-out structure when the park lever is in its disengaged position;

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
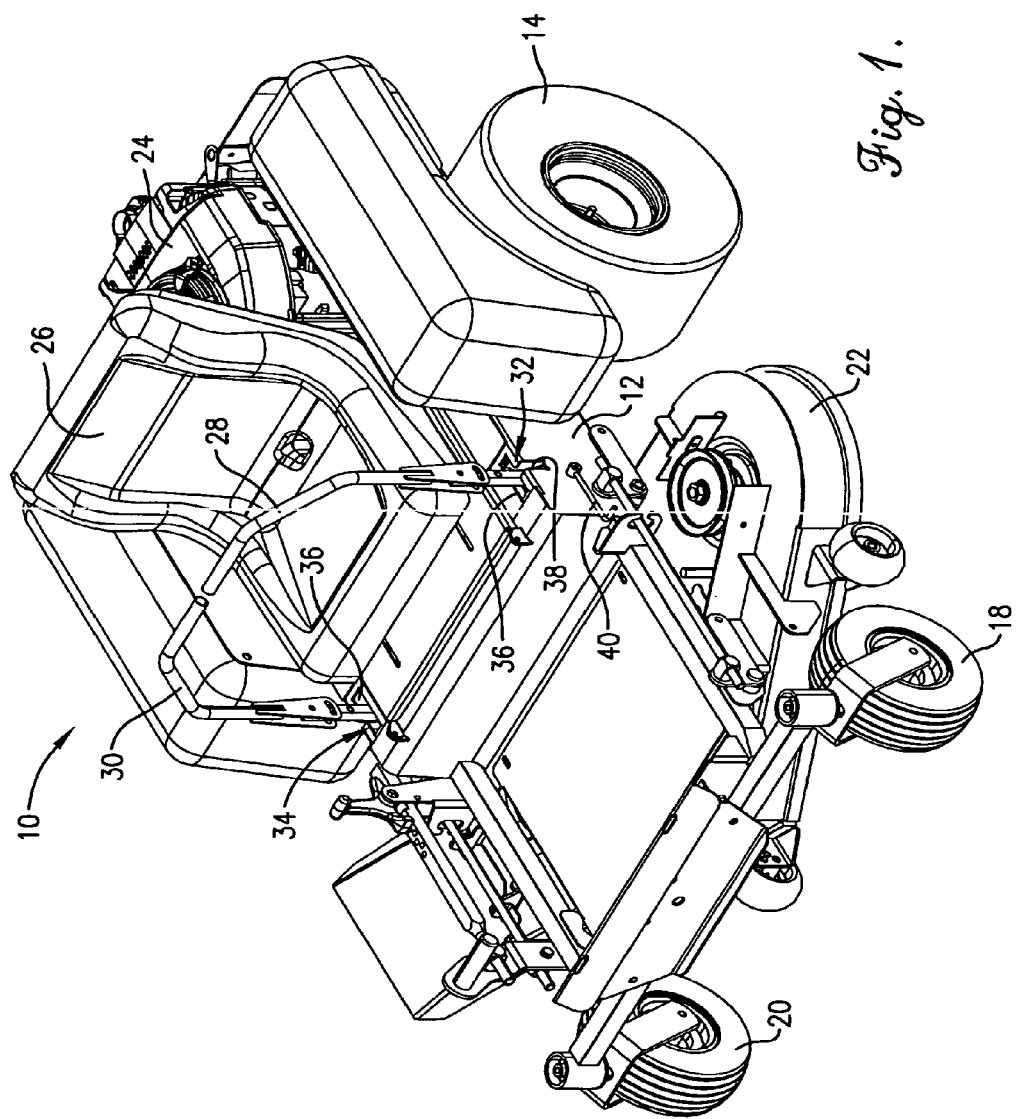
FIG. 1 is a left, front isometric view of a zero turn mower constructed in accordance with the principles of the present invention.
Figure 2:
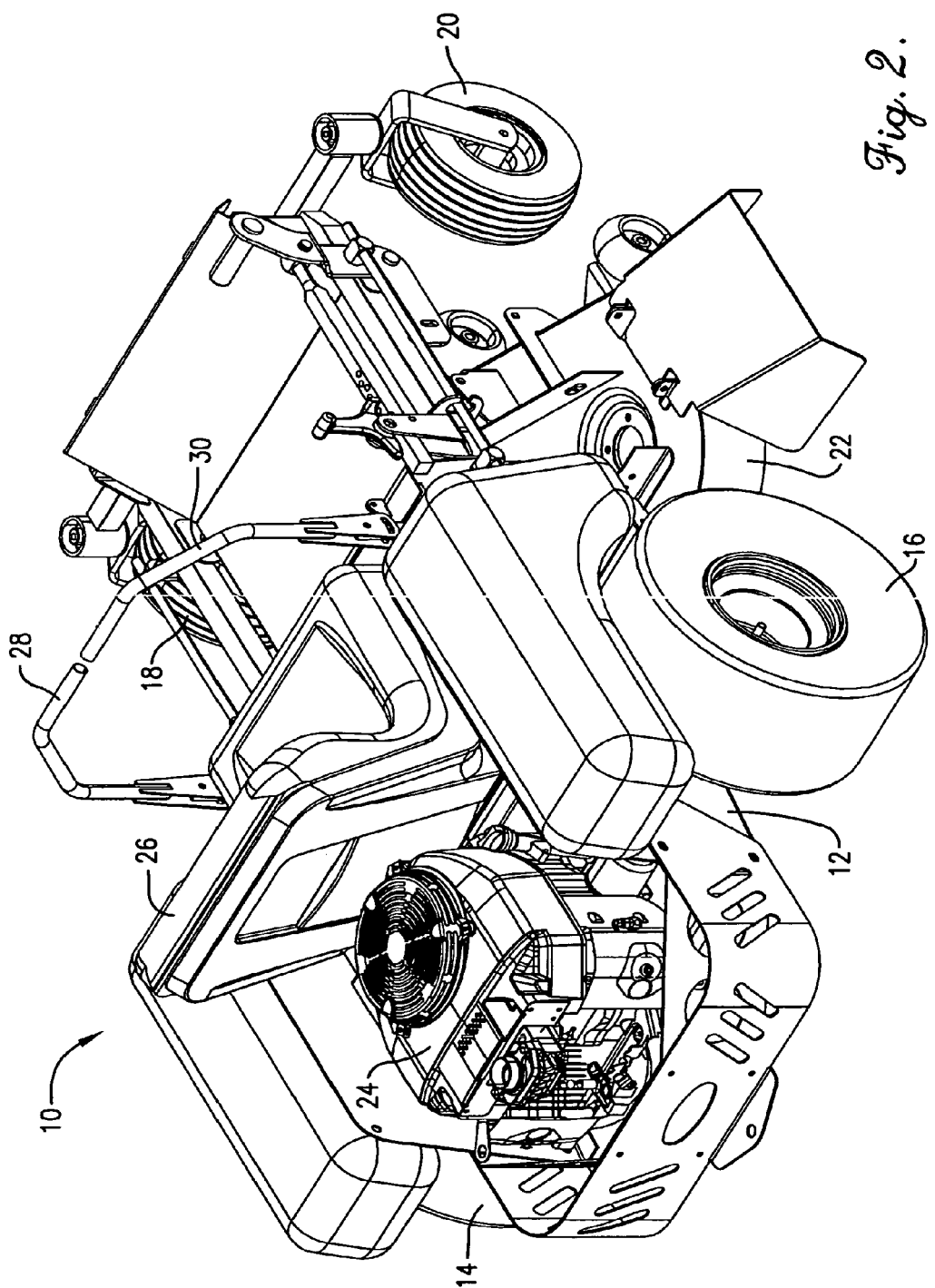
FIG. 2 is a right rear isometric view of the mower.

Referring initially to FIGS. 1 and 2, a mower incorporating the principles of the present invention is depicted therein and indicated by the numeral 10. Mower 10 includes a mobile chassis 12 supported by a pair of ground engaging drive wheels 14, 16 at the rear of the mower and a pair of castoring wheels 18, 20 at the front of the machine. A mower deck 22 is suspended under the belly of the machine. A gasoline engine 24 or other type of prime mover is supported on chassis 12 at the rear of the machine for supplying driving power to wheels 14, 16 and mower deck 22.

Figure 3:
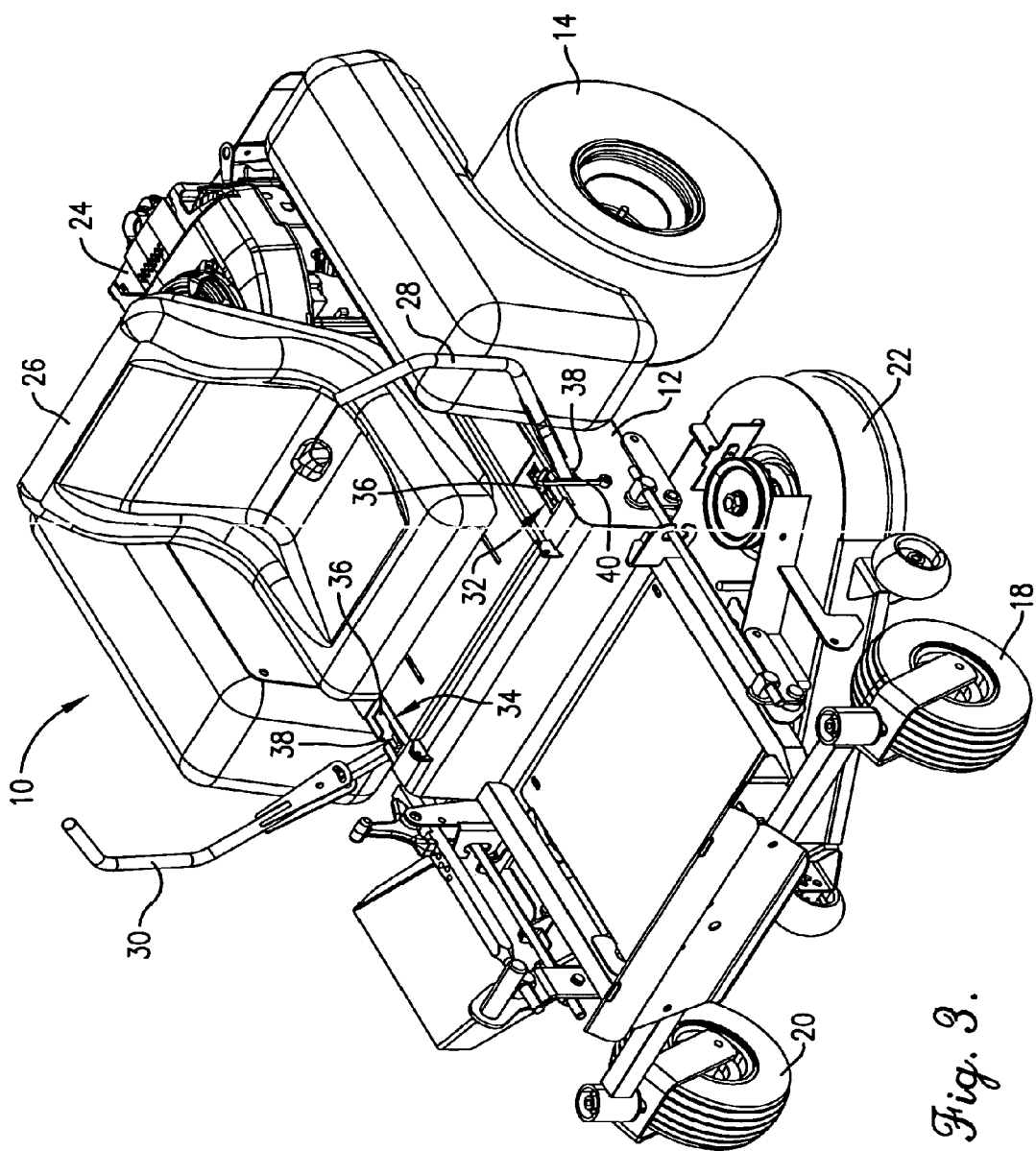
FIG. 3 is a left front isometric view of the mower similar to FIG. 1 but illustrating the drive levers in their widespread positions and the park lever engaged.

An operator's seat 26 is supported on chassis 12 in front of engine 24 in such a position that an operator situated on seat 26 can readily grasp a pair of drive levers 28 and 30 for controlling speed, turning, and forward and reverse of the mower. Levers 28 and 30 are movable independently of one another along fore-and-aft paths of travel within respective T-shaped slots 32 and 34 in chassis 12 for accomplishing such control in a well-known manner. Fore-and-aft legs 36 of T-slots 32, 34 limit levers 28, 30 to fore-and-aft movement through forward, neutral and reverse modes, but transverse legs 38 at the midpoint of fore-and-aft legs 36 corresponding to the neutral position of levers 28, 30 permit the levers to be swung out to their widespread positions as illustrated in FIG. 3 to facilitate ingress and egress of the operator. A park lever 40 on the left side of the machine is swingable vertically between a horizontal disengaged position in FIG. 1 and a vertical, engaged position in FIG. 3 in which park lever 40 places the machine in its parking mode.

Figure 4:
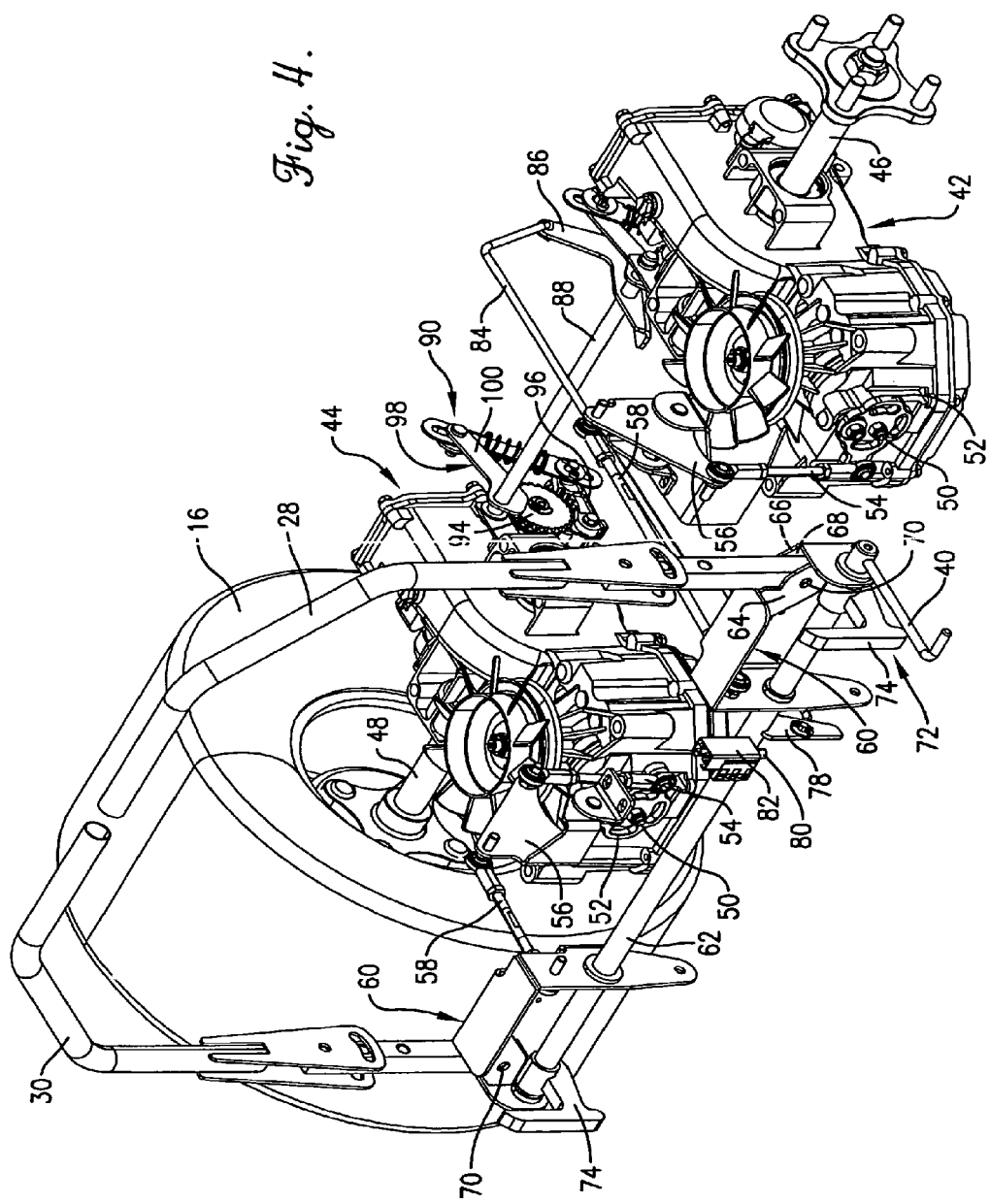
FIG. 4 is a fragmentary, left front isometric view of various control apparatus of the mower with portions of the machine removed to reveal details of construction.
Figure 9:
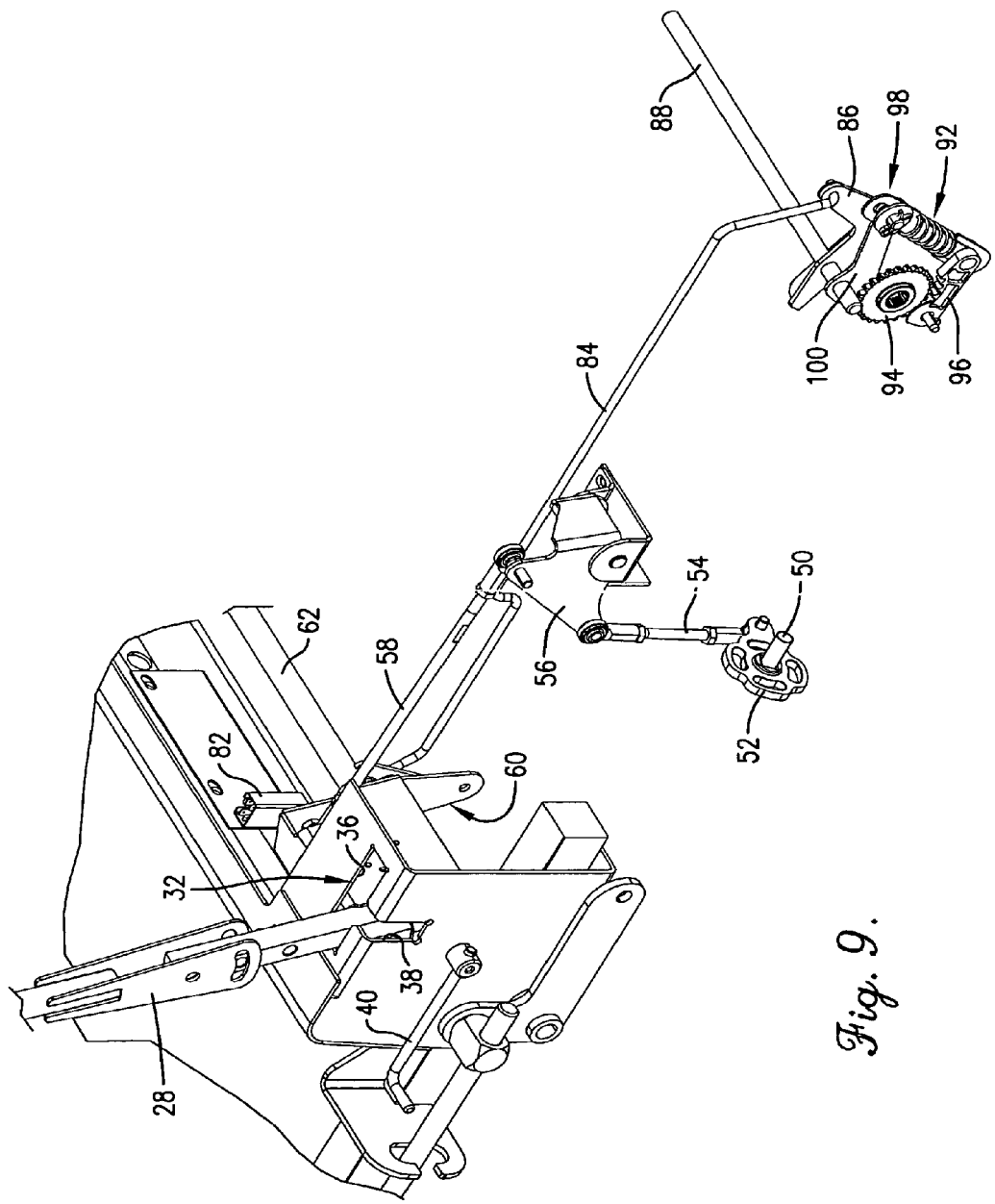
FIG. 9 is a fragmentary left rear isometric view of the control apparatus illustrating the left driver lever in its forward mode and the park lever disengaged.

As illustrated in FIG. 4, mower 10 is preferably provided with a pair of integrated zero-turn transaxles 42 and 44 that are operably coupled with respective axles 46 and 48 associated with drive wheels 14, 16. One suitable source for transaxles 42, 44 is the Hydro-Gear Company of Sullivan, Ill. The two transaxles 42, 44 are driven by an output shaft (not shown) from engine 24.

Among other things, each transaxle 42, 44 includes an internal hydraulic motor operably coupled with the corresponding wheel axle 46 or 48. Such reversible hydraulic motor is supplied hydraulic fluid by an internal pump and reservoir (not shown), the volume and direction of which is regulated by an internal swash plate (not shown) whose position is controlled by a forwardly projecting control shaft 50 at the front of each transaxle 42, 44. Each control shaft 50 has a disc 52 fixed thereto, such disc 52 in turn being operably coupled with an upright link 54 so that up and down movement of link 54 causes rotational movement of disc 52 to in turn rotate control shaft 50 and adjust the position of the internal swash plate. Each link 54 at its upper end is coupled with one corner of a bell crank 56 that is operably connected at its other corner with a fore-and-aft extending control link 58. At their forward ends, links 58 are operably connected to inverted, generally U-shaped, box-like brackets 60 that are independently mounted on a cross shaft 62 for rotational movement relative to shaft 62 about the longitudinal axis thereof. As will be seen, brackets 60 carry respective drive levers 28 and 30 so that fore-and-aft travel of levers 28, 30 is carried out as they swing or pivot in fore-and-aft directions with brackets 60 about shaft 62.

Each of the mounting brackets 60 includes a pair of downwardly and outwardly projecting legs 64 and 66 that are spaced apart in a fore-and-aft direction to define a gap 68 therebetween. The lower portion of the corresponding drive lever 28 or 30 is located within such gap 68 and is pivotally attached to legs 64, 66 by a fore-and-aft pivot (not shown) located within aligned holes 70 in legs 64, 66. The pivot pins thus attach levers 28, 30 to their respective brackets 60 for swinging movement therewith about shaft 62, while also permitting levers 28, 30 to swing laterally in and out within gaps 68 when levers 28, 30 are in the neutral position of FIG. 1 aligned with legs 38 of T-slots 32, 34.

Park lever 40 is fixed to the left outer end of cross shaft 62, the latter being journaled by chassis 12 for oscillation by park lever 40 through a 90° range of motion as illustrated, for example, in FIG. 12. Also fixed to cross shaft 62 just inboard of park lever 40 is lock-out safety structure 72 in the form of a generally hammer-shaped bar 74. A second bar 74 is fixed to the opposite end of shaft 62. The two bars 74 are aligned fore-and-aft with the pivot holes 70 associated with levers 28, 30 so that, when levers 28, 30 are in their widespread positions of FIG. 3, bars 74 may be rotated up into a blocking position between the outwardly angled levers 28, 30 and the inclined legs 64, 68 of brackets 60 as illustrated, for example, in FIGS. 7, 11, 12 and 14. A spacer 76 fixed to the inboard surface of each drive lever 28, 30 is adapted to bear against the outboard face of bar 74 to assist in maintaining levers 28, 30 in their widespread positions when bars 74 are in their park positions. Bars 74 are readily moved into and out of their blocking or park positions by operating park lever 40 when drive levers 28, 30 are in their widespread positions, but when levers 28, 30 are within their fore-and-aft paths of travel at any position along the length thereof, bars 74 are blocked by levers 28, 30 from moving into the park positions.

Located slightly inboard of the left mounting bracket 60 is a projection 78 that is fixed to cross shaft 62 and projects radially outwardly therefrom. Projection 78 is aligned with the actuator 80 of a switch 82 forming part of a control circuit for the mower. Switch 82 is mounted on chassis 12 in a fixed position relative to the rotatable shaft 62 so as to be actuated by projection 78 when lever 40 is in its park position, all as illustrated in FIGS. 7 and 8, for example. The control circuit associated with switch 82 is of such design that once engine 24 is shut off, it cannot be restarted unless switch 82 has first been actuated by projection 78, i.e., park lever 40 is in the park position. Of course, park lever 40 cannot be in the park position unless drive levers 28, 30 are in their wide spread positions within the transverse legs 38 of T-slots 32, 34 in chassis 12. Thus, engine 24 can only be started when the transaxles 42, 44 are in their neutral modes with drive levers 28, 30 in their widespread positions blocked from return to their fore-and-aft paths of travel by lock-out bars 74 with park lever 40 in its park position.

It will be noted that projection 78 is in the nature of a short operating lever or crank. Operably coupled with projection 78 and extending rearwardly therefrom is a single operating link 84 that operably connects at its rear end with a lever 86 fixed to a transversely extending shaft 88. Shaft 88 extends in opposite directions from lever 86 and is operably coupled at its opposite ends with a pair of retaining mechanisms 90 and 92 for preventing rotation of drive wheels 14, 16, when mechanisms 90, 92 are actuated. In a preferred embodiment, retaining mechanisms 90, 92 take the form of lockable park mechanisms, although it is within the concepts of the present invention to have mechanisms 90, 92 take the form of safety brakes for the wheels 14, 16.

In the preferred embodiment, each retaining mechanism 90 includes a cog wheel 94 operably coupled with the corresponding axle 46 or 48 in such a manner that it rotates with such axle. Further included in each retaining mechanism 90 is a locking pawl 96 that can be into and out of interlocking engagement with cog wheel 40 by an operating lever assembly 98 having one lever 100 thereof fixed to shaft 88. Thus, rotation of shaft 88 by operating link 84 causes the pawls 96 to engage and disengage from their corresponding cog wheels 94, thereby actuating and deactuating the retaining mechanisms 90.

Operation

During mowing operations, drive levers 28, 30 are disposed within the fore-and-aft legs 36 of T-slots 32 and 34. This enables drive levers 28, 30 to be shifted independently of one another in appropriate fore and aft movements to control steering, speed and forward or reverse direction of travel. Movement of levers 28, 30 forwardly from the neutral position illustrated in FIG. 1 causes the mower to move forwardly, while moving them rearwardly from the neutral position causes the mower to move rearwardly. Steering of the mower is accomplished by moving one of the levers 28, 30 forward or reverse relative to the other lever.

Figure 13:
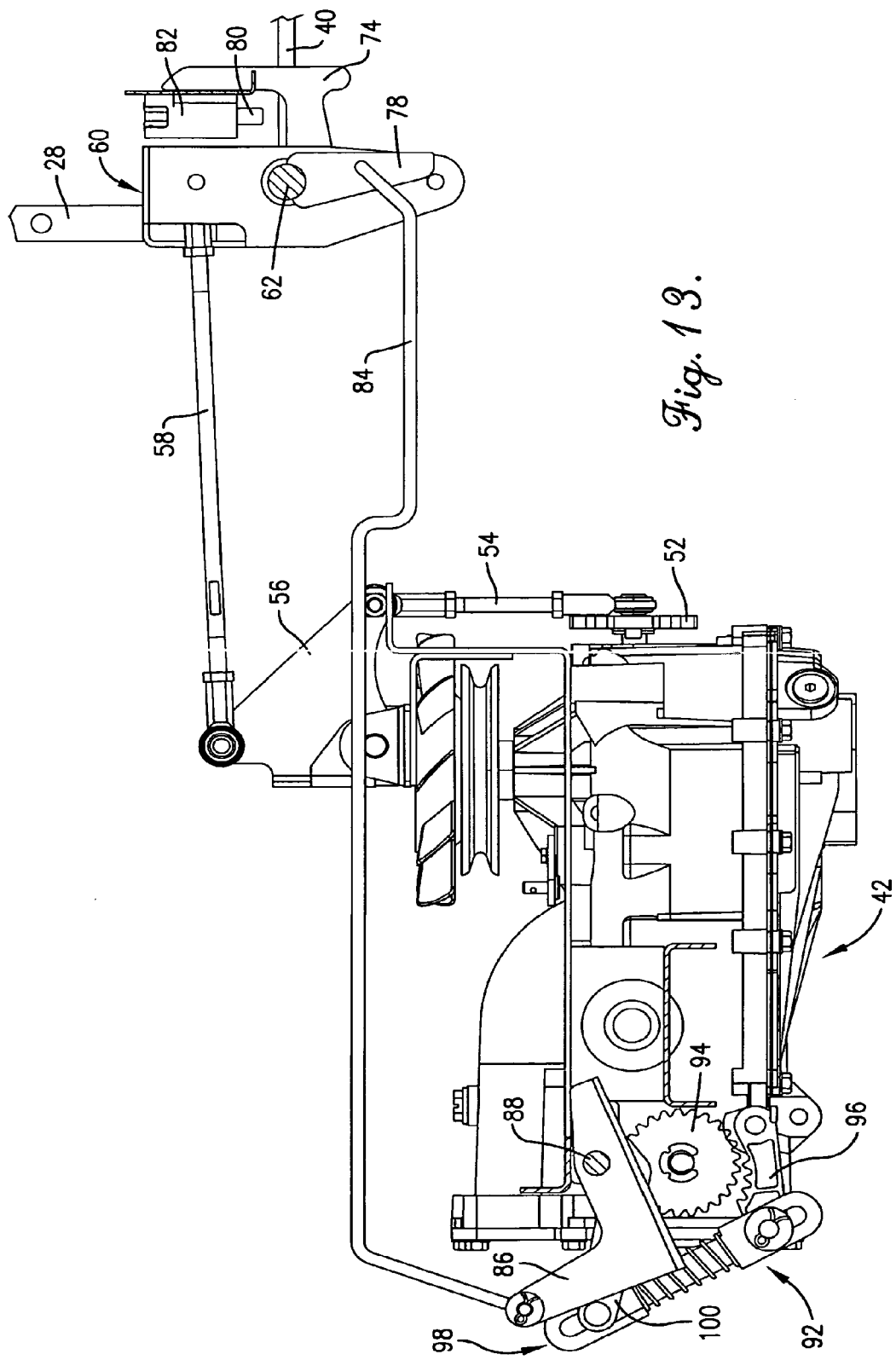
FIG. 13 is a fragmentary horizontal cross sectional view in a fore-and-aft direction through the mower as viewed from the right side thereof with the left drive lever in a neutral mode and the park lever disengaged.
Figure 14:
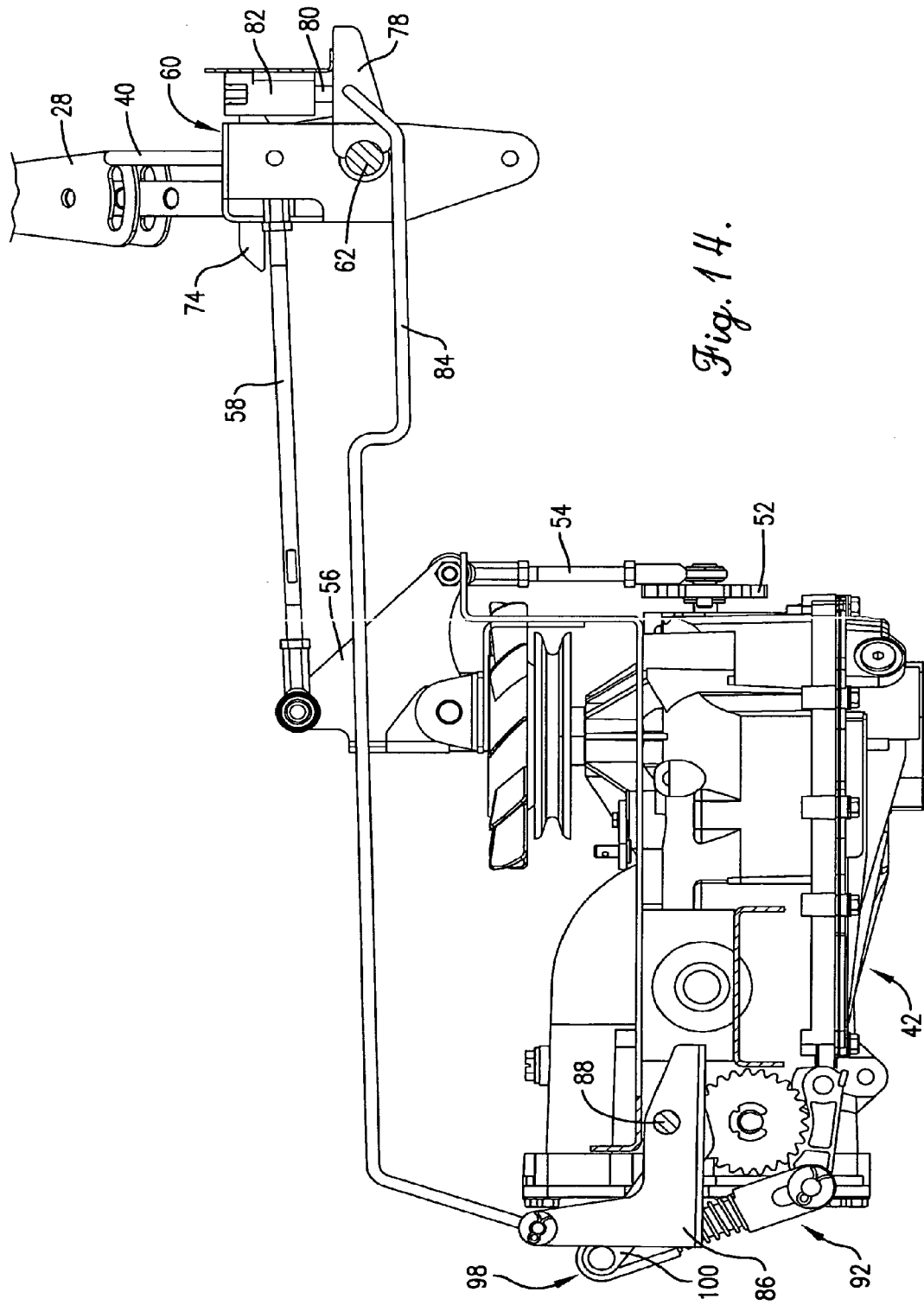
FIG. 14 is a cross sectional view similar to FIG. 13 but illustrating the left drive lever in its widespread position and the park lever in its park position with the safety lock-out switch activated.

When the mower is to be parked and dismounted, the operator places drive levers 28, 30 in their neutral positions aligned with transverse legs 38 of T-slots 32, 34 and then swings the levers out to their widespread positions of FIG. 3. Grasping park lever 40, the operator then places the machine in a parked mode by swinging lever 40 upwardly into its upright park position as illustrated in FIG. 3. This causes the blocking bars 74 on cross shaft 62 to swing from their released positions of FIGS. 4 and 13 to their park positions of FIGS. 7, 8, 11, 12 and 14. With bars 74 in their park positions, drive levers 28, 30 cannot be returned to their fore-and-aft paths of travel. At the same time, with park lever 40 in the park position, switch 82 is engaged by projection 78.

The ignition control circuit (not shown) is such that engine 24 may be turned off at any time. However, if engine 24 is shut off when the mower is not in the park mode, switch 82 will be in an unactuated condition, and engine 24 cannot be restarted.

To restart engine 24, park lever 40 must be in its park position of FIG. 3 so that switch 82 is actuated by projection 78. By then releasing park lever 40, drive levers 28, 30 may be moved into their fore-and-aft paths of travel and manipulated in the ususal manner to control the mower.

The inventor hereby states his intent to rely on the Doctrine of Equivalents to determine and assess the reasonably fair scope of his invention as pertains to any apparatus not materially departing from but outside the literal scope of the invention as set out in the following claims.

The invention claimed is:

1. In a riding mower having an engine and a pair of independent drive wheels controlled by a corresponding pair of operator-manipulated drive levers, said levers being movable independently of one another along parallel, fore-and-aft paths of travel between forward, neutral, and reverse drive modes and being movable outwardly away from one another to widespread positions when in the neutral mode, the improvement comprising:
    a pair of retaining mechanisms operable when actuated to prevent rotation of said wheels, there being one of said retaining mechanisms for each of said wheels; and
    a park lever operably coupled with said retaining mechanisms for actuating both of said retaining mechanisms simultaneously when the park lever is moved to a park position,
    said park lever being movable into said park position when the drive levers are in said widespread positions and having lockout structure operably coupled therewith for preventing return of the drive levers to their paths of travel when the park lever is in said park position.

2. In a riding mower as claimed in claim 1,
    further comprising a switch operable to prevent startup of said engine unless the park lever is in the park position.

3. In a mower as claimed in claim 1,
    said retaining mechanism including a cog wheel rotatable with each of said drive wheels respectively,
    said retaining mechanism further including a pawl disposed in interlocking engagement with said cog wheel when the retaining mechanism is actuated.

4. In a mower as claimed in claim 1,
    said lockout structure including a bar movable into a position for blocking the return of a drive lever to its path of travel from its widespread position.

5. In a mower as claimed in claim 4,
    said park lever being fixed to a pivotal shaft for movement about the axis of the shaft into and out of said park position,
    said bar being fixed to said shaft for movement with the park lever.

6. In a mower as claimed in claim 5,
    said drive levers being mounted for swinging movement relative to said shaft about the axis of the shaft.

7. In a mower as claimed in claim 6,
    each of said drive levers being mounted on a bracket for pivotal movement relative to the bracket toward and away from the widespread position,
    each of said brackets being pivotally mounted on said shaft for rotational movement of the brackets and their drive levers relative to the shaft about the axis of the shaft as the levers move along their paths of travel.

8. In a mower as claimed in claim 7,
    each of said brackets having a link operably coupled therewith for controlling the speed and direction of rotation of a corresponding drive wheel.

9. In a mower as claimed in claim 5,
    said shaft having a link operably coupled therewith and with the retaining mechanisms for actuating the mechanisms in response to rotation of said shaft by the park lever.

10. In a mower as claimed in claim 2,
    said park lever being fixed to a pivotal shaft for movement about the axis of the shaft into and out of said park position,
    said shaft having a projection disposed for operating engagement with said switch when the park lever is in said park position.

11. In a mower as claimed in claim 10,
    said shaft having a link operably coupled therewith and with the retaining mechanisms for actuating the mechanisms in response to rotation of said shaft by the park lever.

12. In a mower as claimed in claim 1,
    said park lever being fixed to a pivotal shaft for movement about the axis of the shaft into and out of said park position.

* * * * *